US012457581B2

(12) United States Patent
Fujishiro

(10) Patent No.: US 12,457,581 B2
(45) Date of Patent: Oct. 28, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 468 days.

(21) Appl. No.: 17/825,668

(22) Filed: May 26, 2022

(65) Prior Publication Data
US 2022/0287004 A1 Sep. 8, 2022

Related U.S. Application Data

(63) Continuation of application No. PCT/JP2020/044117, filed on Nov. 26, 2020.

(30) Foreign Application Priority Data

Nov. 27, 2019 (JP) ................. 2019-214616

(51) Int. Cl.
H04W 68/02 (2009.01)
H04W 8/22 (2009.01)

(52) U.S. Cl.
CPC ............ *H04W 68/02* (2013.01); *H04W 8/22* (2013.01)

(58) Field of Classification Search
CPC ......... H04W 68/02; H04W 8/22; H04W 8/26; H04W 60/005; H04W 88/06
See application file for complete search history.

(56) References Cited

U.S. PATENT DOCUMENTS

| 9,408,183 | B2 | 8/2016 | Chirayil |
| 2011/0122809 | A1 | 5/2011 | Yun et al. |
| 2017/0196042 | A1 | 7/2017 | Shah et al. |
| 2020/0196273 | A1* | 6/2020 | Ozturk ............... H04W 68/02 |
| 2020/0359196 | A1* | 11/2020 | Balasubramaniam ............ H04W 72/30 |

(Continued)

FOREIGN PATENT DOCUMENTS

| JP | 2022-523988 A | 4/2022 |
| WO | 2020/178483 A1 | 9/2020 |

OTHER PUBLICATIONS

3GPP Technical Report; "Technical Specification Group Services and System Aspects"; 3GPP TR 22.834; Sep. 2019; Total 16 pages; V17.1.0.; http://www.3gpp.org/ftp/Specs/archive/22_series/22.834/22834-h10.zip.

(Continued)

Primary Examiner — Mazda Sabouri
(74) Attorney, Agent, or Firm — Studebaker Brackett PLLC

(57) ABSTRACT

A user equipment according to an aspect is registered with a first mobile network by using a first subscriber identity module (SIM) and registered with a second mobile network using a second SIM. The user equipment includes a processor. The processor executes a process of receiving, from the first mobile network, configuration information for configuring either a non-execution timing for not executing downlink transmission from the first mobile network to the user equipment or an execution timing for executing the downlink transmission. The processor executes a process of transmitting, to the second mobile network, identification information for identifying a timing configured according to the configuration information.

5 Claims, 10 Drawing Sheets

(56) References Cited

U.S. PATENT DOCUMENTS

2022/0264522 A1* 8/2022 Brusilovsky .......... H04W 68/02
2022/0312374 A1* 9/2022 Ryu ................... H04W 68/005

OTHER PUBLICATIONS

Sony; "Solution for KI#3: Receiving Paging Occasions in other Networks"; 3GPP TSG SA WG2 #136; S2-1911145; Nov. 8, 2019; Total 6 pages; section 6.X.
Intel, Sony, Oppo, Interdigital; "Solution for Paging Reception with PO collision avoidance"; 3GPP TSG SA WG2 #136; S2-1911942; Nov. 15, 2019; Total 13 pages; section 6.X.3.

* cited by examiner

COMMUNICATION CONTROL METHOD AND USER EQUIPMENT

RELATED APPLICATIONS

The present application is a continuation based on PCT Application No. PCT/JP2020/044117, filed on Nov. 26, 2020, which claims the benefit of Japanese Patent Application No. 2019-214616 filed on Nov. 27, 2019. The content of which is incorporated by reference herein in their entirety.

TECHNICAL FIELD

The present disclosure relates to a communication control method and a user equipment.

BACKGROUND ART

A user equipment needs to be equipped with a Subscriber Identity Module (SIM) in order to utilize a mobile communication service (voice call service, data communication service, or the like) provided by a communication operator (operator or communication carrier) via a mobile network. Once the user equipment is registered with the mobile network using the SIM, the user equipment can utilize the mobile communication service from the mobile network of the registration destination.

In recent years, user equipments have been spread that can be equipped with a plurality of SIMs. A user equipment equipped with two SIMs (first SIM and second SIM) may utilize a mobile communication service from a first mobile network, which is a mobile network of the registration destination of the first SIM, and may utilize a mobile communication service from a second mobile network, which is a mobile network of the registration destination of the second SIM. The discussion of a use case in which both mobile communication services are utilized has been initialized in the Third Generation Partnership Project (3GPP) (e.g., Non-Patent Literature 1).

CITATION LIST

Non-Patent Literature

Non-Patent Literature 1: 3GPP Technical Report TR 22.834 "TR 22.834 V17.1.0" September 2019, Internet <URL: http://www.3gpp.org/ftp/Specs/archive/22_series/22.834/22834-h10.zip>

SUMMARY

A communication control method according to a first aspect is a communication control method using a user equipment. The user equipment is configured to be registered with a first mobile network by using a first subscriber identity module (SIM) and to be registered with a second mobile network by using a second SIM. The communication control method includes receiving, by the user equipment, from the first mobile network, configuration information for configuring either a non-execution timing for not executing downlink transmission from the first mobile network to the user equipment or an execution timing for executing the downlink transmission, and transmitting, by the user equipment, to the second mobile network, identification information for identifying a timing configured according to the configuration information.

A communication control method according to a second aspect is a communication control method using a user equipment. The user equipment is configured to be registered with a first mobile network by using a first subscriber identity module (SIM) and to be registered with a second mobile network by using a second SIM. The communication control method includes identifying, by the user equipment, a first paging reception occasion corresponding to a candidate timing when the user equipment receives a paging message from the first mobile network, identifying, by the user equipment, a second paging reception occasion corresponding to a candidate timing when the user equipment receives a paging message from the second mobile network, identifying, by the user equipment, one of the first mobile network and the second mobile network as a priority mobile network, determining, by the user equipment, whether an overlap timing when the first paging reception occasion overlaps with the second paging reception occasion is present, and in a case of determining that the overlap timing is present, performing, by the user equipment, a first control or a second control. The first control is a control for receiving only the paging message from the priority mobile network at the overlap timing. The second control is a control for transmitting a request to modify the paging reception occasion to a non-priority mobile network out of the first mobile network and the second mobile network, the non-priority network being not the priority mobile network.

A user equipment according to a third aspect is configured to be registered with a first mobile network using a first subscriber identity module (SIM) and to be registered with a second mobile network using a second SIM. The user equipment includes a processor. The processor executes a process of receiving, from the first mobile network, configuration information for configuring either a non-execution timing for not executing downlink transmission from the first mobile network to the user equipment or an execution timing for executing the downlink transmission. The processor executes a process of transmitting, to the second mobile network, identification information for identifying a timing configured according to the configuration information.

A user equipment according to a fourth aspect is configured to be registered with a first mobile network using a first subscriber identity module (SIM) and to be registered with a second mobile network using a second SIM. The user equipment includes a processor. The processor executes a process of identifying a first paging reception occasion corresponding to a candidate timing when the user equipment receives a paging message from the first mobile network. The processor executes a process of identifying a second paging reception occasion corresponding to a candidate timing when the user equipment receives a paging message from the second mobile network. The processor executes a process of identifying one of the first mobile network and the second mobile network as a priority mobile network. The processor executes a process of determining whether an overlap timing when the first paging reception occasion overlaps with the second paging reception occasion is present. The processor executes a process of performing first control or second control in a case of determining that the overlap timing is present. The first control is a control for receiving only the paging message from the priority mobile network at the overlap timing. The second control is a control for transmitting a request to modify the paging reception occasion for a non-priority mobile network out of the first mobile network and the second mobile network, the non-priority mobile network being not the priority mobile network.

DESCRIPTION OF EMBODIMENTS

In a case that a user equipment includes only a single radio receiver, when downlink transmission from a first mobile network and downlink transmission from a second mobile network occur at the same time, the downlink transmission from one of the first and the second mobile networks may fail to be received. In particular, in a case that the first mobile network and the second mobile network belong to different communication operators, it is difficult to avoid such problems by collaboration between the mobile networks.

An object of the present disclosure is to enable a user equipment that can be equipped with a plurality of SIMs to avoid a collision of downlink transmissions from a plurality of mobile networks.

A mobile communication system according to an embodiment will be described with reference to the drawings. In the description of the drawings, the same or similar parts are denoted by the same or similar reference signs.

Mobile Communication System

A configuration of a mobile communication system according to an embodiment will be described. Although the mobile communication system according to an embodiment is a 5G system of the 3GPP, LTE may be at least partially applied to the mobile communication system.

Figure 1:
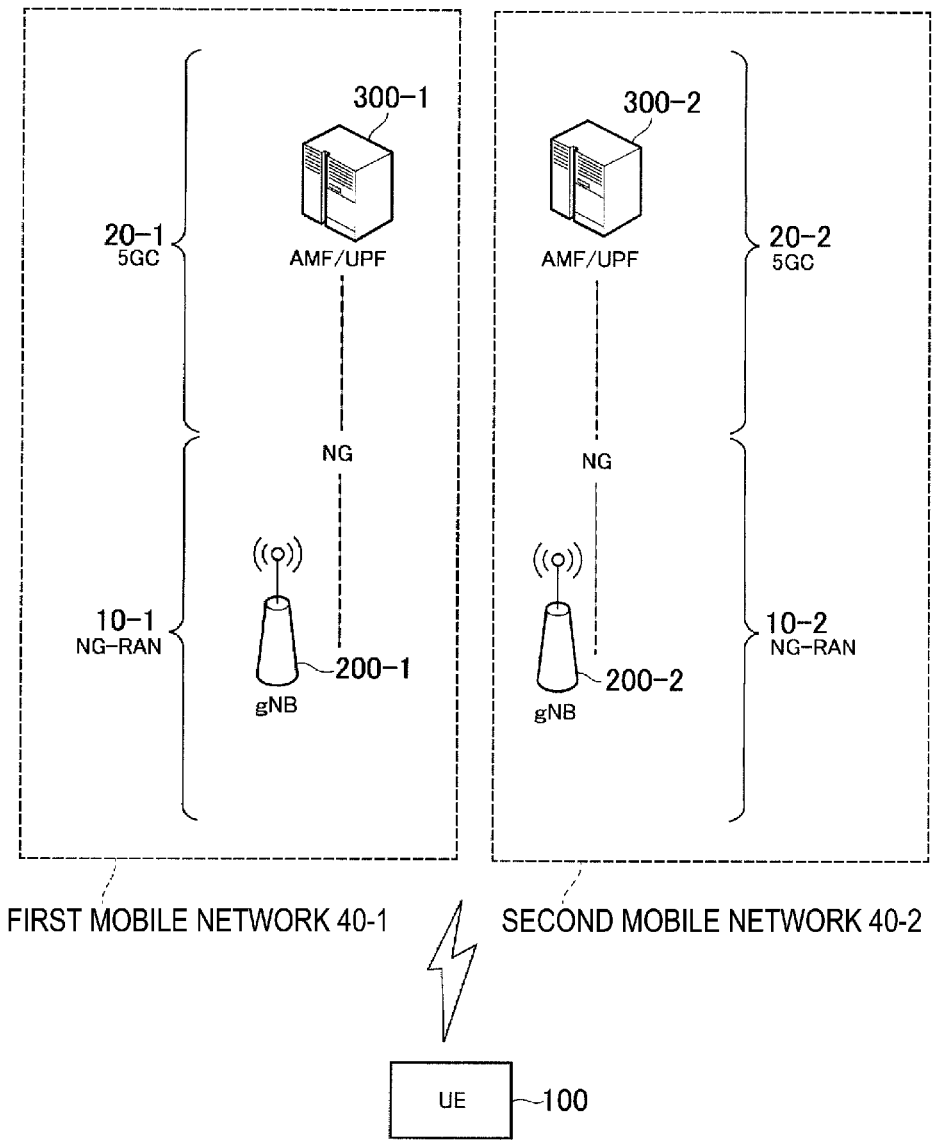
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a first mobile network 40-1 operated by a first communication operator, a second mobile network 40-2 operated by a second communication operator different from the first communication operator, and a User Equipment (UE) 100. The UE 100 can register with the first mobile network 40-1 using a first SIM 140-1 described below, and can register with the second mobile network 40-2 using a second SIM 140-2 described below. Hereinafter, when the first mobile network 40-1 and the second mobile network 40-2 are not distinguished from each other, the first and the second mobile networks 40-1 and 40-2 are simply referred to as a mobile network 40.

Each mobile network 40 includes a 5G radio access network (Next Generation Radio Access Network (NG-RAN)) 10, and a 5G core network (5GC) 20.

The UE 100 is a mobile apparatus. The UE 100 may be any apparatus as long as the UE is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface (not illustrated) corresponding to an inter-base station interface. Each gNB 200 manages one or a plurality of cells. The gNB 200 performs wireless communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a wireless communication area. A "cell" is also used as a term to indicate a function or a resource for performing wireless communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF 300 manages information of the area in which the UE 100 exists by communicating with the UE 100 by using Non-Access Stratum (NAS) signaling. The UPF controls data transfer. The AMF and UPF are connected to the gNB 200 via an NG interface which is an interface between a base station and the core network.

Figure 2:
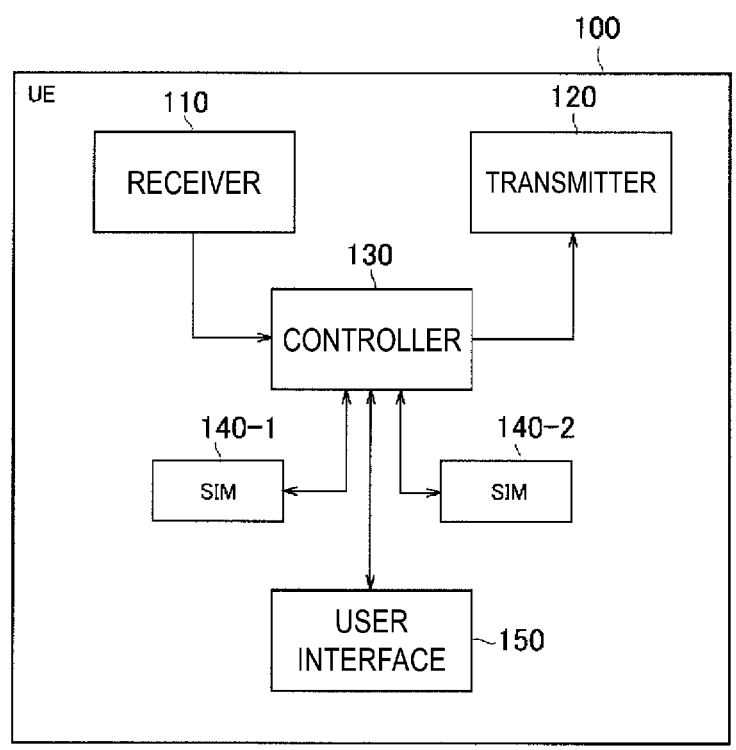
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, a controller 130, a SIM 140-1 (first SIM), a SIM 140-2 (second SIM), and a user interface 150. The UE 100 may include three or more SIMs 140.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various types of processes.

The SIM 140 records information identifying a subscriber to receive a mobile communication service provided from the mobile network. In the SIM 140, information may be recorded that includes, in addition to information identifying a subscriber, operator identification information for identifying a communication operator, and information related to available services that a subscriber subscribes to. The SIM 140 may be an IC card referred to as a removable SIM card (or a USIM card), i.e., an information card. The SIM 140 may be an Embedded SIM (eSIM) which is of an embedded type.

Information recorded in the SIM 140-1 (first SIM) identifies a first International Mobile Subscriber Identity (IMSI) corresponding to an identification number assigned to a user of the UE 100 from a first communication operator operating the first mobile network 40-1. Information recorded in the SIM 140-2 (second SIM) identifies a second IMSI corresponding to an identification number assigned to the user of the UE 100 from a second communication operator operating the second mobile network 40-2. The SIM 140-1 and the SIM 140-2 may be separate information cards, or may be integrated into an identical information card. The SIM 140-1 and the SIM 140-2 may be included in an Embedded SIM (eSIM).

The SIM 140-1 is managed by the first communication operator. The SIM 140-2 is managed by the second communication operator. Note that the SIM 140-1 and the SIM 140-2 may be managed by the identical communication operator.

In a case of using the SIM 140-1 to register with the first mobile network 40-1, the UE 100 can utilize the mobile communication service provided by the first communication operator via the first mobile network 40-1. Additionally, in a case of using the SIM 140-2 to register with the second mobile network 40-2, the UE 100 can utilize the mobile communication service provided by the second communication operator via the second mobile network 40-2.

The user of the UE 100 may configure the priorities of SIM 140-1 and SIM 140-2 via the user interface 150. The user may configure the priorities such that the SIM 140-1 is prioritized over the SIM 140-2 or that the SIM 140-2 is prioritized over the SIM 140-1.

Figure 3:
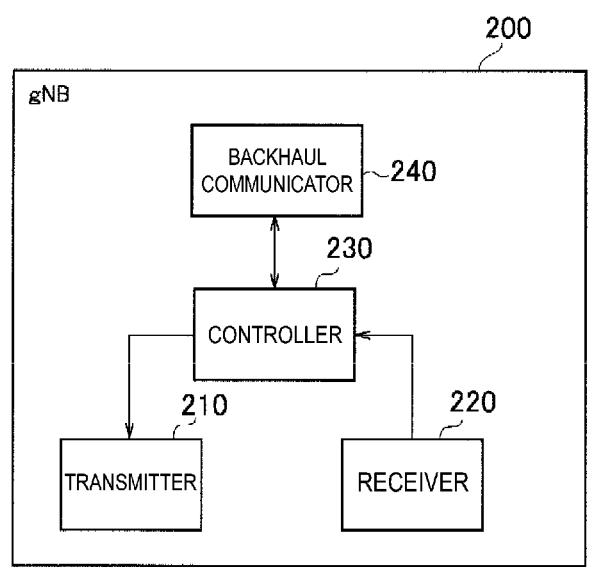
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of control for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network.

Figure 4:
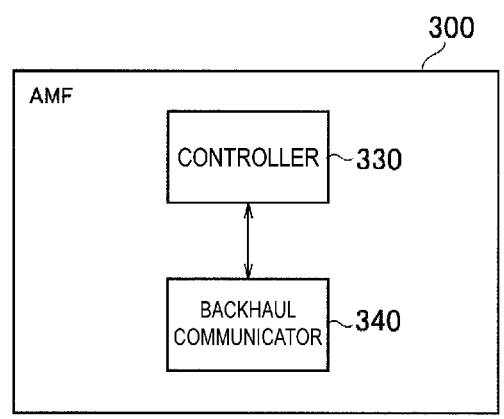
FIG. 4 is a diagram illustrating a configuration of a core network apparatus according to an embodiment.

FIG. 4 is a diagram illustrating a configuration of an AMF 300 (core network apparatus).

As illustrated in FIG. 4, the AMF 300 includes a controller 330 and a backhaul communicator 340.

The controller 330 performs various types of control in the AMF 300. The controller 330 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 340 is connected to the gNB 200 via the interface between the base station and the core network.

Figure 5:
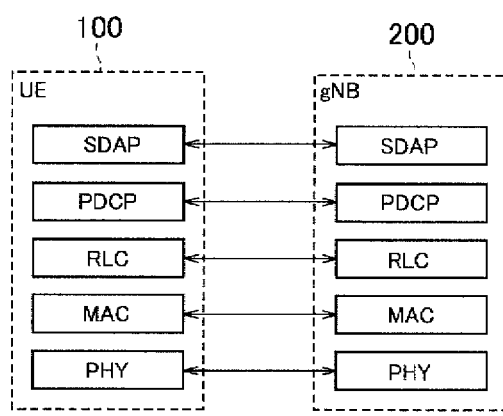
FIG. 5 is a diagram illustrating a configuration of a protocol stack of a radio interface in a user plane according to an embodiment.

FIG. 5 is a diagram illustrating a configuration of a protocol stack of a radio interface in a user plane handling data.

As illustrated in FIG. 5, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

In the PHY layer, a frame structure is used that includes radio frames, subframes, slots, and symbols. The radio frame includes 10 subframes on the time axis. Each subframe has a length of 1 ms. Each subframe includes a plurality of slots. Each slot includes a plurality of symbols. Each subframe includes a plurality of resource blocks (RBs) on a frequency axis. Each resource block includes a plurality of subcarriers on the frequency axis. Among the radio resources (time and frequency resources) allocated to the UE 100, frequency resources can be identified by resource blocks and time resources can be identified by subframes (or slots or symbols).

In a downlink, a section of several leading symbols of each subframe is a region used as a Physical Downlink Control CHannel (PDCCH) for mainly transmitting downlink control information. The remaining portion of each subframe is a region that can be used as a Physical Downlink Shared CHannel (PDSCH) for mainly transmitting downlink data.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 6:
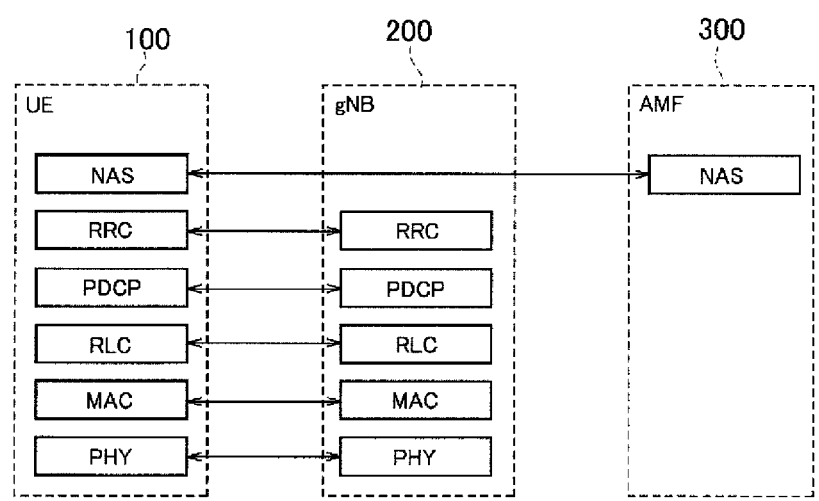
FIG. 6 is a diagram illustrating a configuration of a protocol stack of a radio interface in a control plane handling signaling (control signals) according to an embodiment.

FIG. 6 is a diagram illustrating a configuration of a protocol stack of a radio interface in a control plane handling signaling (control signals).

As illustrated in FIG. 6, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. In a case that a connection (RRC connection) is present between the RRC of the UE 100 and the RRC of the gNB 200, the UE 100 is in an RRC connected state. When there is no connection (RRC connection) between the RRC of the UE 100 and the RRC of the gNB 200, the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

First Embodiment

A first embodiment will be described based on the assumption of the system configuration as described above.

In an embodiment, the UE 100 includes only a single radio receiver (receiver 110). In this case, when downlink transmission from the first mobile network 40-1 and downlink transmission from the second mobile network 40-2 occur at the same time, the downlink transmission from one mobile network 40 out of the first mobile network 40-1 and the second mobile network 40-2 may fail to be received. In particular, in a case that the first mobile network 40-1 and the second mobile network 40-2 belong to different communication operators, it is difficult to avoid such problems by collaboration between the mobile networks 40. A first embodiment for avoiding such problems will be described below.

The UE 100 according to the first embodiment is registered with the first mobile network 40-1 by using the first SIM (SIM 140-1) and registered with the second mobile network 40-2 by using the second SIM (SIM 140-2).

The UE 100 receives, from the first mobile network 40-1, configuration information for configuring either a non-execution timing for not executing downlink transmission from the first mobile network 40-1 to the UE 100 or an execution timing for executing the downlink transmission. The UE 100 transmits, to the second mobile network 40-2, identification information for identifying the timing configured by using the configuration information. The UE 100 for which the non-execution timing is configured is exempted from monitoring of the PDCCH at the non-execution timing.

Thus, the second mobile network 40-2 can determine the timing for downlink transmission to the UE 100 such that the timing matches the non-execution timing configured for the UE 100 from the first mobile network 40-1. In addition, the second mobile network 40-2 can determine the timing for downlink transmission to the UE 100 to avoid the execution timing configured for the UE 100 from the first mobile network 40-1. Thus, the UE 100 can avoid the collision of downlink transmissions from the first mobile network 40-1 and the second mobile network 40-2.

An example of the non-execution timing is a measurement timing when the UE 100 in the RRC connected state in the first mobile network 40-1 suspends communication with the first mobile network 40-1 to measure a carrier frequency different from the carrier frequency of the first mobile network 40-1. Such measurement timing may be referred to as a measurement gap. The measurement gap is configured for the UE 100 from the gNB 200 by using a dedicated RRC message including a gap configuration information for configuring a measurement gap. The gap configuration information includes information indicating the period of measurement, the start timing for measurement, the duration of one operation of measurement, and/or the like. The period of measurement may be referred to as a Measurement Gap Repetition Period (MGRP). The duration of one operation of measurement may be referred to as a Measurement Gap Length (MGL). The combination of the period of measurement and the duration of one operation of measurement may be referred to as a measurement gap pattern.

An example of the execution timing is a downlink communication period to which downlink resources are periodically allocated (hereinafter, simply referred to as the "downlink communication period"). The downlink communication period is identified by the downlink Semi-Persistent Scheduling (SPS) configured for the UE 100 in the RRC connected state in the first mobile network 40-1. In the downlink SPS, the period is configured for the UE 100 by using a dedicated RRC message, and allocation resource blocks are specified for the UE 100 by using the PDCCH. The UE 100 uses, in a period configured by RRC, the resources specified by using the PDCCH.

Other examples of execution timing include a candidate timing when the UE 100 in the RRC idle state or the RRC inactive state receives a paging message from the mobile network (first mobile network 40-1 or second mobile network). Such a timing is referred to as a paging reception occasion.

The paging reception occasion will now be described. The UE 100 can perform a Discontinuous Reception (DRX) operation to reduce power consumption. The UE 100 in the RRC idle state or the RRC inactive state, performing the DRX operation, intermittently monitors the PDCCH to receive paging for notifying information such as an incoming call which is addressed to the UE 100. The UE 100 decodes the PDCCH by using a group identifier for paging (P-RNTI) to acquire allocation information for a paging channel. The UE 100 acquires a paging message based on the allocation information.

The PDCCH monitoring timing for paging in the DRX operation in the RRC idle state or the RRC inactive state is referred to as a paging occasion (PO). The PO is associated with a Paging Frame (PF) corresponding to a radio frame. The PO associated with one PF may start within the PF or start after the PF. The PO may be in units of subframes and may be configured by using one or a plurality of subframes. The PO may be in units of symbols and may be configured by using a plurality of symbols. One PF is associated with one or a plurality of POs. Parameters defining the correspondence relationship between the PF and the PO are included in paging-related information included in System Information Blocks (SIBs) broadcast by the gNB 200.

The gNB 200 and the UE 100 calculates the PF and PO corresponding to the paging reception occasion for the UE 100 as described below.

The system frame number (SFN) of the PF corresponding to the paging reception occasion for the UE 100 is determined from Equation (1) below.

$$(SFN + PF\_offset) \bmod T = (T \div N) * (UE\_ID \bmod N) \quad (1)$$

Among the POs associated with the PF, the PO corresponding to the paging reception occasion for the UE 100 is determined by index i_s obtained from Equation (2) below.

$$i\_s = \mathrm{floor}(UE\_ID/N) \bmod Ns \quad (2)$$

T is the DRX cycle of the UE 100 for monitoring paging. The DRX cycle may be referred to as a paging cycle. The DRX cycle is represented by the number of radio frames. In addition, T is a smaller value of a default DRX value broadcast by the gNB 200 by using the System Information Block (SIB) and a UE-specific DRX value configured for the UE 100. The UE-specific DRX value is configured for the UE by using the RRC message or the NAS message. Note that in a case that the UE-specific DRX value is not configured, the UE 100 applies the default DRX value. N is the number of PFs in T. Ns are the number of POs associated with one PF. UE_ID is a value obtained by "5G-S-TMSI mod 1024." PF_offset is a value used to determine the PF. N, Ns, and PF_offset are included in the paging-related information included in the SIB.

The Temporary Mobile Subscriber Identity (5G-S-TMSI) is a temporary subscriber identity allocated to the UE 100 by the AMF 300 when the UE 100 registers with the mobile network 40.

In the PF and PO corresponding to the paging reception occasion for UE 100 calculated as described above, the UE 100 monitors paging (specifically, the PDCCH). In a case that the gNB 200 is required to transmit paging for the UE 100, the gNB 200 transmits paging destined for the UE 100 at the PF and PO corresponding to the paging reception occasion for the UE 100.

Operation Example 1 of First Embodiment

Figure 7:
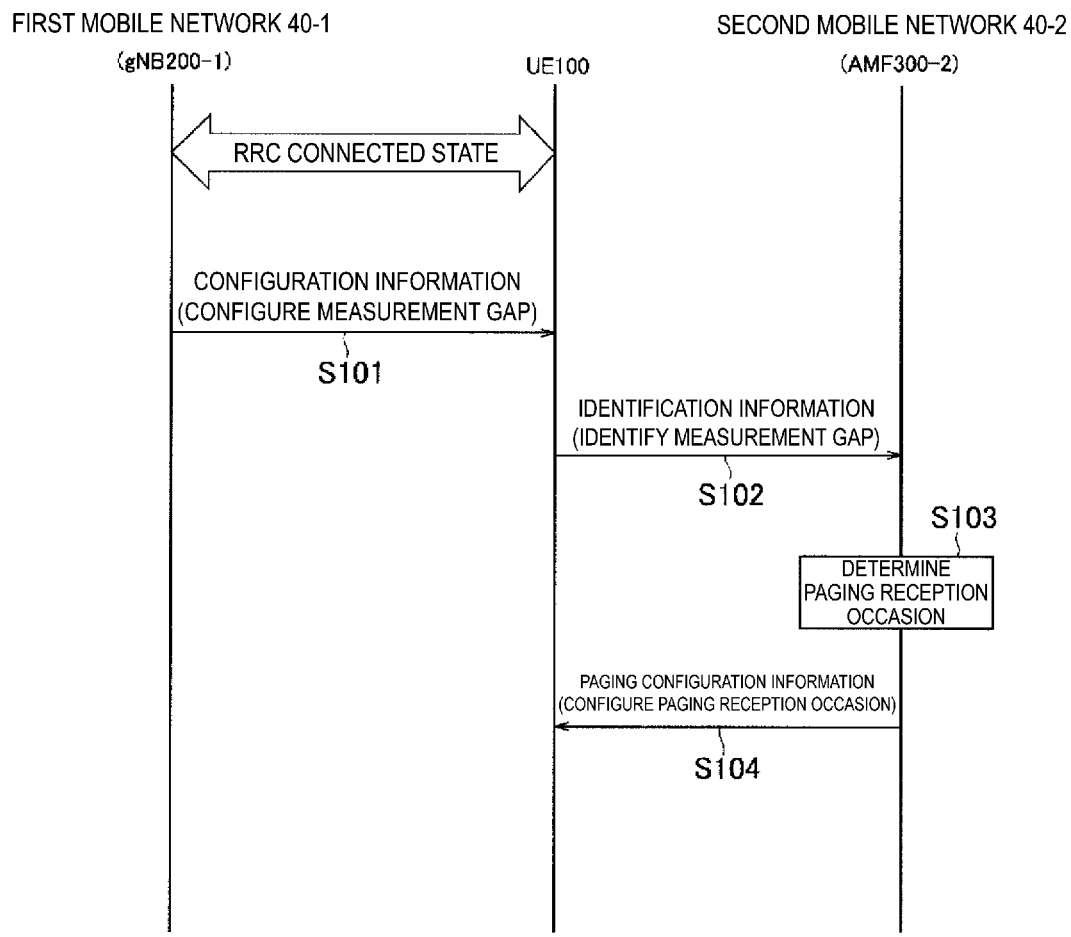
FIG. 7 is a diagram illustrating operations according to Operation Example 1 of a first embodiment.

FIG. 7 is a diagram illustrating operations according to Operation Example 1 of the first embodiment. Now, operations according to Operation Example 1 the first embodiment will be described in brief.

In the initial state of Operation Example 1, the UE 100 is registered with the first mobile network 40-1 and the second mobile network 40-2. The UE 100 is in the RRC connected state in the first mobile network 40-1. The UE 100 is in the RRC idle state or the RRC inactive state in the second mobile network 40-2.

As illustrated in FIG. 7, in step S101, the UE 100 receives the gap configuration information from the gNB 200-1 belonging to the first mobile network 40-1. The UE 100 identifies a measurement gap configured for the UE 100 based on the gap configuration information.

In step S102, the UE 100 transmits, to an AMF 300-2 belonging to the second mobile network 40-2, identification information for identifying the measurement gap configured for the UE 100.

In step S103, the AMF 300-2 determines the paging reception occasion for the UE 100 based on the measurement gap identified by the identification information.

In step S104, the AMF 300-2 transmits, to the UE 100, information for configuring the paging reception occasion for the UE 100 determined (hereinafter referred to as "paging configuration information"). The paging configuration information includes information indicating the 5G-S-TMSI, the UE-specific DRX value, and the like described above.

Now, each of the operations in S102 to S104 will be described in detail.

In S102, when transmitting the identification information, the UE 100 transmits the identification information to the AMF 300-2 via the gNB 200-2. The UE 100 may transmit the identification information together with a request to configure or modify the paging reception occasion.

When transmitting the identification information, the UE 100 performs a Random Access Channel (RACH) procedure for the gNB 200-2. The UE 100 may transmit the identification information after establishing an RRC connection for the gNB 200-2. The UE 100 may transmit the identification information together with an MSG3 message in the RACH procedure before establishing an RRC connection for the gNB 200-2.

Here, in a case that the UE 100 transmits the identification information after establishing the RRC connection, the UE 100 receives paging configuration information from the AMF 300-2 via the gNB 200-2 in the RRC connected state (step S104).

In a case that the UE 100 transmits the identification information together with the MSG3 message, the UE 100 may receive paging configuration information from the AMF 300-2 via the gNB 200-2 in a state where no RRC connection is established for the gNB 200-2 (the RRC inactive state or the RRC idle state) (step S104). In a case of receiving the identification information from the UE 100 along with the MSG3 message, the gNB 200-2 transfers the identification information to the AMF 300-2 with no message to establish the RRC connection transmitted to the UE 100. Then, the gNB 200-2 transmits, to the UE 100, the paging configuration information received from the AMF 300-2.

When transmitting the identification information, the UE 100 may transmit the identification information during the measurement gap configured from the first mobile network 40-1 to avoid adversely affecting the communication with the first mobile network 40-1. Alternatively, prior to transmitting the identification information (before step S102), the UE 100 may request the gNB 200-1 to suspend the RRC connection, and after transitioning to a state where the RRC connection is suspended (the RRC inactive state), may transmit the identification information.

In step S103, the AMF 300-2 determines the paging reception occasion for the UE 100 to receive a paging message from the second mobile network 40-2 such that the paging reception occasion is within the measurement gap. For example, based on the identification information, the AMF 300-2 first identifies a plurality of subframes corresponding to the measurement gap of the UE 100. Then, the AMF 300-2 determines some of the plurality of subframes identified as the PO corresponding to the paging reception occasion for the UE 100. As needed, the AMF 300-2 may acquire, from the gNB 200-2, paging-related information included in the SIB broadcast by the gNB 200-2 and determine the PO with reference to the paging-related information.

In step S104, the AMF 300-2 transmits the paging configuration information to the UE 100 via the gNB 200-2.

The MSG3 described above may be a message (RRCResumeRequest message) for requesting recovery of the RRC connection in the RRC inactive state, or may be a message (RRCSetupRequest message) for requesting establishment of an RRC connection in the RRC idle state.

In Operation Example 1, the UE 100 may transmit the identification information in a case that a predetermined trigger condition is satisfied. The trigger condition for transmitting the identification information will be described below. The predetermined trigger condition includes at least one of a first condition to a third condition described below.

The first condition is that the paging reception occasion for the UE 100 to receive the paging message from the second mobile network 40-2 does not overlap with the measurement gap configured for the UE 100 from the first mobile network 40-1. In a case that an overlap timing when the paging reception occasion overlaps with the measurement gap is present, the UE 100 can receive paging at the overlap timing, and thus does not need to transmit the identification information.

After the UE 100 receives the gap configuration information from the gNB 200-1 (after step S101) and before step S102, the UE 100 identifies the paging reception occasion based on the information included in the SIB transmitted by the gNB 200-2 and the temporary subscriber identity (5G-S-TMSI) allocated from the AMF 300-2 when the UE 100 registers with the second mobile network 40-2. In a case that the UE 100 determines whether the identified paging reception occasion overlaps with the measurement gap and determines that identified paging reception occasion does not overlap with the measurement gap, the UE 100 transmits the identification information in step S102.

The second condition is that the radio bearer (bearer for transmission and/or reception of user data) established by the UE 100 with the first mobile network 40-1 has a priority equal to or higher than a threshold value. The priority of the radio bearer is determined by the type of traffic of the user data mapped to the radio bearer. For example, in a case that the type of the traffic is a voice call, the priority is determined to be high, and in a case that the type of the traffic is a mail, a chat, and/or web browsing, the priority is determined to be low.

In a case that the priority of the radio bearer is high (the priority is equal to or higher than the threshold value), the UE 100 transmits the configuration information because the reception of the downlink user data on the radio bearer does not collide with the paging reception occasion corresponding to the second mobile network 40-2. On the other hand, when the priority of the radio bearer is low, in a case that the reception of the downlink user data on the radio bearer collides with the paging reception occasion corresponding to the second mobile network 40-2, the reception of paging may be prioritized over the reception of the user data, and thus the UE 100 does not need to transmit the identification information.

The third condition is that the user possessing the UE 100 configures the SIM 140-1 corresponding to the first mobile network 40-1 and the SIM 140-2 corresponding to the second mobile network 40-2 such that the SIM 140-1 is prioritized over the SIM 140-2.

In Operation Example 1, the configuration information may configure an inactive period of the DRX operation in the RRC connected state as a non-execution timing. The identification information may identify the inactive period as the non-execution timing.

In Operation Example 1, the identification information may identify the timing when the UE 100 can receive the paging message. The AMF 300-2 may determine the paging reception occasion such that the paging reception occasion is within the timing. The UE 100 may determine such timing when reception is enabled based on the non-execution timing configured from the first mobile network 40-1.

Operation Example 2 of First Embodiment

Figure 8:
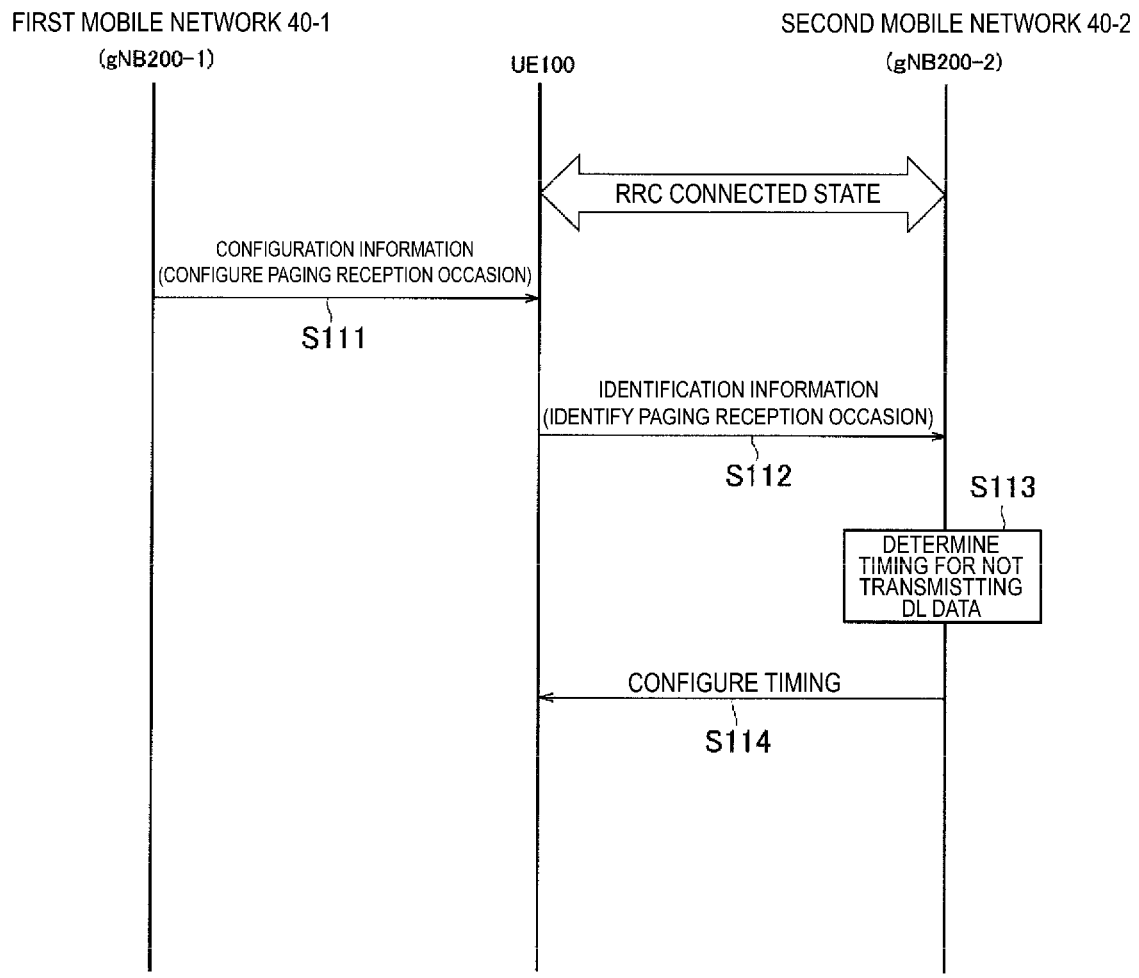
FIG. 8 is a diagram illustrating operations according to Operation Example 2 of the first embodiment.

FIG. 8 is a diagram illustrating operations according to Operation Example 2 of the first embodiment.

In an initial state of Operation Example 2, the UE 100 is registered with the first mobile network 40-1 and the second mobile network 40-2. The UE 100 is in the RRC idle state or the RRC inactive state in the first mobile network 40-1. The UE 100 is in the RRC connected state in the second mobile network.

As illustrated in FIG. 8, in step S111, the UE 100 receives, from the gNB 200-1 belonging to the first mobile network 40-1, configuration information for configuring a paging reception occasion for the UE 100 to receive a paging message from the first mobile network 40-1. The configuration information includes parameters for calculating the PF and PO corresponding to the paging reception occasion included in the SIB broadcast by the gNB 200-1. Such parameters include the default DRX values, PF_offset, N, Ns, and the like described above.

The UE 100 identifies the PF and PO corresponding to the paging reception occasion based on the parameters included in the configuration information and the 5G-S-TMSI and the UE-specific DRX value.

In step S112, the UE 100 transmits, to the gNB 200-2 belonging to the second mobile network 40-2, the identification information for identifying the paging reception occasion. The identification information may be information indicating the PF and PO corresponding to the paging reception occasion identified by the UE 100. The identification information may be information for identifying the PF and PO (5G-S-TMSI, default DRX value, UE-specific DRX value, T, N, Ns, PF_offset, etc.).

In step S113, the gNB 200-2 determines a timing for not transmitting downlink user data to the UE 100, based on the paging reception occasion (PF and PO) identified by the identification information. For example, the gNB 200-2 determines the subframe belonging to the PO corresponding to the paging reception occasion as a timing for not transmitting downlink user data to the UE 100.

In Step S114, the gNB 200-2 transmits, to the UE 100, information for configuring the timing determined.

In Operation Example 2, the UE 100 may transmit the identification information in a case that the predetermined trigger condition is satisfied. The predetermined trigger condition may include the third condition described above.

Operation Example 3 of First Embodiment

Figure 9:
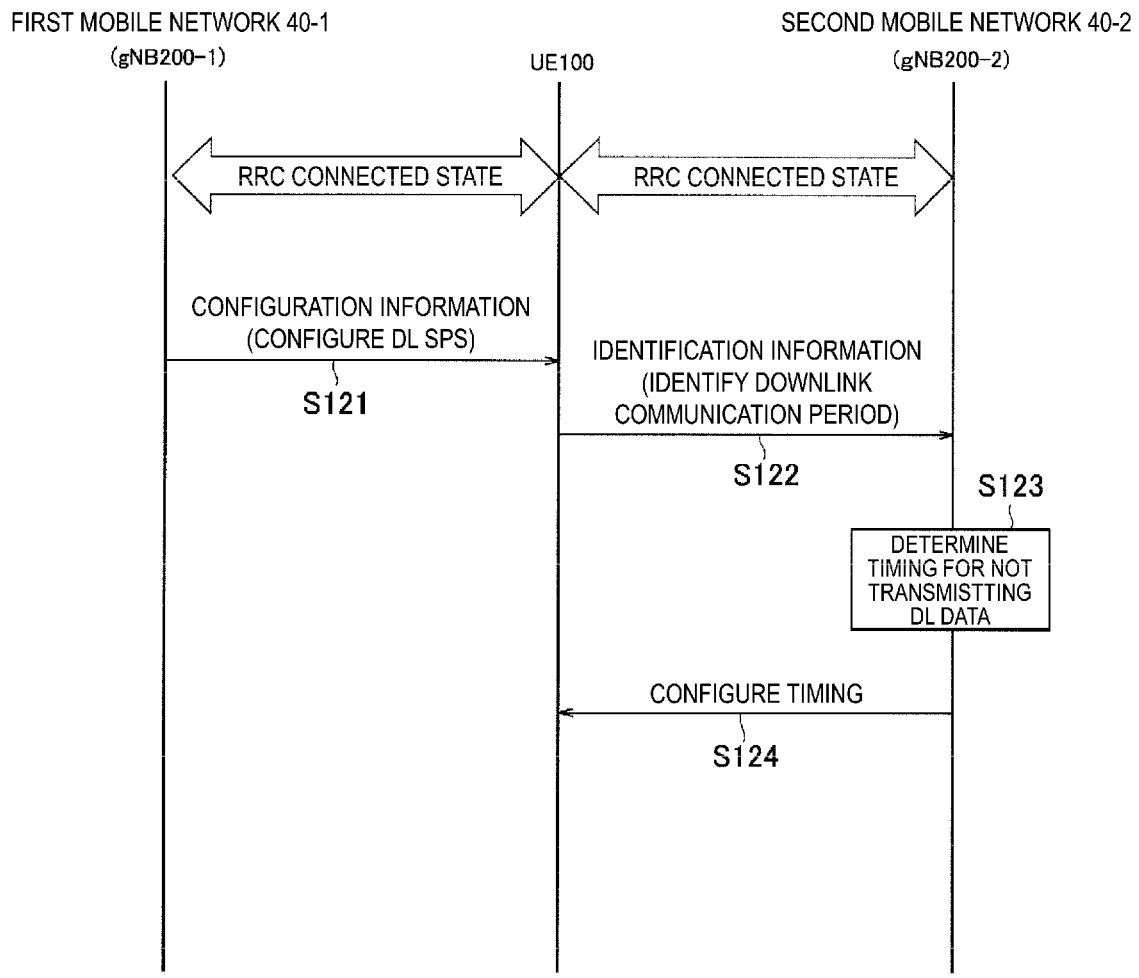
FIG. 9 is a diagram illustrating operations according to Operation Example 3 of the first embodiment.

FIG. 9 is a diagram illustrating operations according to Operation Example 3 of the first embodiment.

In the initial state of Operation Example 3, the UE 100 is registered with the first mobile network 40-1 and the second mobile network 40-2. The UE 100 is in the RRC connected state in the first mobile network 40-1. The UE 100 is in the RRC connected state in the second mobile network 40-2.

As illustrated in FIG. 9, in step S121, the UE 100 receives, from the gNB 200-1 belonging to the first mobile network 40-1, configuration information (information for configuring downlink SPS) for configuring a downlink communication period. The UE 100 identifies the downlink communication period based on the configuration information.

In step S122, the UE 100 transmits, to the gNB 200-2 belonging to the second mobile network 40-2, the identification information for identifying the downlink communication period configured by the gNB 200-1. The identification information may be information indicating the downlink communication period. The identification information may be information for configuring the downlink SPS.

In step S123, the gNB 200-2 determines a timing for not transmitting downlink user data to the UE 100, based on the downlink communication period identified by the identification information. For example, the gNB 200-2 determines the subframe belonging to the downlink communication period as a timing for not transmitting downlink user data to the UE 100.

In Step S124, the gNB 200-2 transmits, to the UE 100, information for configuring the timing determined.

In Operation Example 3, the trigger condition for the UE 100 to transmit the identification information is not mentioned. In Modification Example 1 of Operation Example 3, the UE 100 transmits the identification information in a case that the predetermined trigger condition is satisfied. The predetermined trigger condition includes at least one of the above-described second condition, third condition, and fourth condition described below. The fourth condition is that the radio bearer established by the UE 100 with the first mobile network 40-1 has a higher priority than the radio bearer established by the UE 100 with the second mobile network 40-2.

Second Embodiment

A second embodiment will be described focusing on differences from the first embodiment.

In the first embodiment, the UE 100 transmits, to the second mobile network 40-2, the identification information for identifying the execution timing or non-execution timing configured for the UE 100 by the first mobile network 40-1, thus enabling avoidance of collision of downlink transmissions. In the second embodiment, such a problem is solved mainly by the autonomous operation of the UE 100.

The UE 100 according to the second embodiment is registered with the first mobile network 40-1 by using the first SIM (SIM 140-1) and registered with the second mobile network 40-2 by using the second SIM (SIM 140-2).

The UE 100 identifies a first paging reception occasion when a paging message is received from the first mobile network 40-1. The UE 100 identifies a second paging reception occasion when the paging message is received from the second mobile network. The UE 100 identifies a priority mobile network out of the first mobile network 40-1 and the second mobile network. The UE 100 determines whether an overlap timing when the first paging reception occasion overlaps with the second paging reception occasion is present. In a case of determining that the overlap timing is present, the UE 100 performs first control or second control. The first control is control that receives only the paging message from the priority mobile network at the overlap timing. The second control is control for transmitting a request to modify the paging reception occasion for a non-priority mobile network out of the first mobile network 40-1 and the second mobile network, which is not the priority mobile network.

With the first control, in a case that the transmission of the paging message from the first mobile network 40-1 collides with the transmission of the paging message from the second mobile network 40-2 at the UE 100, the reception of the paging message corresponding to the priority network can be ensured.

The second control can avoid a collision of the transmission of the paging message from the first mobile network 40-1 and the transmission of the paging message from the second mobile network 40-2 at the UE 100.

Figure 10:
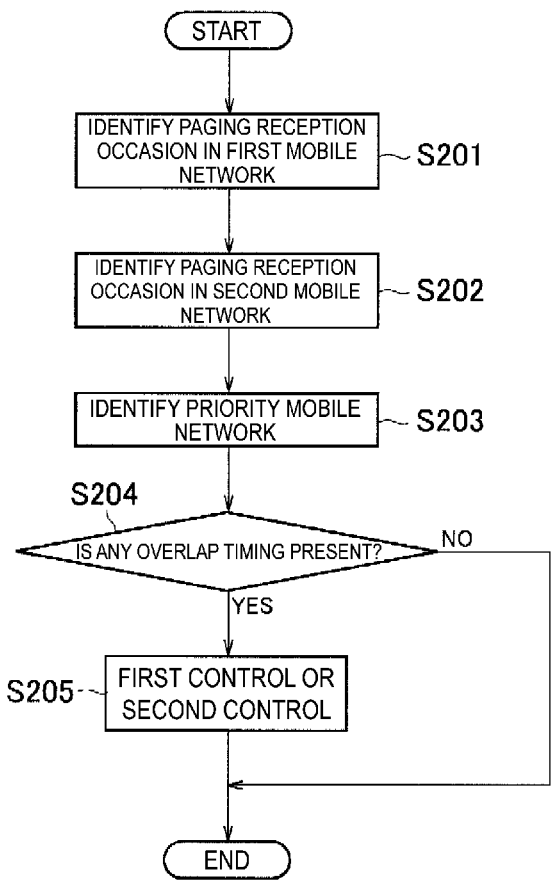
FIG. 10 is a diagram illustrating an operation example of a second embodiment.

FIG. 10 is a diagram illustrating operation according to the second embodiment.

In the initial state of the second embodiment, the UE 100 is registered with the first mobile network 40-1 and the second mobile network 40-2. The UE 100 is in the RRC idle state or the RRC inactive state in the first mobile network 40-1. The UE 100 is in the RRC idle state or the RRC inactive state in the second mobile network 40-2.

As illustrated in FIG. 10, in step S201, the UE 100 identifies the first paging reception occasion (PF and PO) for receiving the paging message from the first mobile network 40-1. The paging reception occasion is identified by the default DRX value, the UE-specific DRX value, PF_offset, N, Ns, 5G-S-TMSI, and the like described above.

In step S202, the UE 100 identifies the second paging reception occasion (PF and PO) for receiving the paging message from the second mobile network 40-2. The paging reception occasion is identified by the default DRX value, the UE-specific DRX value, PF_offset, N, Ns, 5G-S-TMSI, and the like described above.

In step S203, the UE 100 identifies one of the second mobile network 40-2 and the first mobile network 40-1 as the priority mobile network 40. Here, the UE 100 identifies the priority mobile network 40 in a first or second method described below:

The first method is a method for identifying the mobile network 40 with a longer paging cycle (i.e., the value of T in Equation (1) above) as the priority mobile network 40. Within a certain period of time, the number of POs corresponding to the paging reception occasion for the UE 100 in the mobile network 40 with a shorter paging cycle is greater than the number of POs corresponding to the paging reception occasion for the UE 100 in the mobile network 40 with a longer paging cycle. Thus, for the reception of the paging message from the mobile network 40 with a short paging cycle, the UE 100 can perform the reception at another PO corresponding to the paging reception occasion instead of performing the reception at the overlap timing.

The second method is a method for identifying, as the priority mobile network 40, the mobile network 40 corresponding to either SIM of the SIMs 140-1 or 140-2, that is configured by the user to be prioritized. Here, the description below assumes that the UE 100 identifies the first mobile network 40-1 as a priority mobile network and identifies the second mobile network 40-2 as a non-priority mobile network.

In step S204, the UE 100 determines whether an overlap timing when the first paging reception occasion (PF and PO) identified in step S201 overlaps with the second paging reception occasion (PF and PO) identified in step S202 is present.

In a case of determining that the overlap timing is present (step S204: YES), in step S205, the UE 100 receives only the paging message from the first mobile network 40-1 at the overlap timing (first control). Alternatively, in step S205, the UE 100 transmits a request to modify the paging reception occasion for the second mobile network 40-2 (second control).

In a case that the UE 100 transmits, to the second mobile network 40-2, a request to modify the paging reception occasion, the AMF 300-2 belonging to the second mobile network 40-2 receives the request via the gNB 200-2. In response to the request, the AMF 300-2 modifies the temporary subscriber identity (5G-S-TMSI) allocated to the UE 100. The AMF 300-2 transmits information to the UE 100 identifying the modified temporary subscriber identity. Here, modifying the temporary subscriber identity is to newly generate a temporary subscriber identity or provide an offset for the temporary subscriber identity already allocated to the UE 100. The information identifying the modified temporary subscriber identity may be information indicating a new temporary subscriber identity, or may be information indicating an offset provided for the temporary subscriber identity.

The request to modify the paging reception occasion, the request being transmitted from the UE 100 to the second mobile network 40-2, may be a modification request (modification is left to the discretion of the AMF 300-2) or a request to modify, to a particular temporary subscriber identity, the temporary subscriber identity (5G-S-TMSI) allocated to the UE 100. In the latter case, the UE 100 specifies a new candidate for 5G-S-TMSI and includes the candidate in the request for transmission. The UE 100 may notify 5G-S-TMSI allocated from the mobile network 40-1 or a part of the 5G-S-TMSI (e. g., "UE_ID" described above).

In a case that an offset is provided for the temporary subscriber identity, when the UE 100 is paged, the AMF 300-2 includes information indicating the offset in the paging message addressed to the UE 100 and transmits the paging message to the gNB 200-2.

OTHER EMBODIMENTS

In the first embodiment, the UE 100 receives, from the first mobile network 40-1, the configuration information for configuring the execution timing for executing downlink transmission, and transmits, to the second mobile network 40-2, the identification information for identifying the execution timing for executing the downlink transmission configured by using the configuration information. In other embodiments, the UE 100 may receive, from the first mobile network 40-1, the configuration information for configuring the execution timing for executing uplink transmission, and transmit, to the second mobile network 40-2, the identification information for identifying the uplink timing configured by using the configuration information. An example of the execution timing for executing the uplink transmission is a downlink communication period in which uplink resources are periodically allocated (hereinafter, simply referred to as the "downlink communication period"). The downlink communication period is identified by the uplink SPS configured for the UE 100 in the RRC connected state in the first mobile network 40-1. In the uplink SPS, the period is configured for the UE 100 in a dedicated RRC message, and allocation resource blocks are specified for the UE 100 by using the PDCCH. The UE 100 uses, in a period configured by RRC, the resources specified by using the PDCCH.

The UE 100 may notify the mobile network 40 when using two SIMs 140 (SIM 140-1 and SIM 140-2) simultaneously. In a case that the notification is made, a gap configuration may be performed by the first mobile network 40-1 with which the UE 100 has already been registered, the gap configuration allowing the UE 100 to be registered and communicate with the second mobile network 40-2. The UE uses the gap configuration to access the second mobile network 40-2. When using three or more SIMs 140 simultaneously, the UE 100 may notify the mobile network 40 of the use. In this case, a gap configuration may be performed by one of the mobile networks 40 with which the UE 100 has already been registered, the gap configuration allowing the UE 100 to be registered and communicate with the remaining two mobile networks 40.

A program may be provided that causes a computer to execute each process performed by the UE 100, the gNB 200, and the AMF 300. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chipset including a memory that stores a program for executing each process performed by the UE 100 and the eNB 200 and a processor that executes the program stored in the memory may be provided.

Embodiments have been described above in detail with reference to the drawings, but specific configurations are not limited to those described above, and various design modifications can be made without departing from the gist of the present disclosure.

The invention claimed is:

1. A communication control method using a user equipment configured to communicate with a first mobile network by using a first subscriber identity module (SIM) and to communicate with a second mobile network by using a second SIM, the communication control method comprising:
   receiving, by the user equipment from the first mobile network, information for determining timing of uplink transmission to the first mobile network;
   transmitting, by the user equipment to the second mobile network, a gap request indicating the timing of uplink transmission to the first mobile network; and
   receiving, by the user equipment from the second mobile network, configuration information configuring a gap based on the gap request to the user equipment.

2. A user equipment configured to communicate with a first mobile network by using a first subscriber identity module (SIM) and to communicate with a second mobile network by using a second SIM, the user equipment comprising a processor and a memory, the processor is configured to:
   receive, from the first mobile network, information for determining timing of uplink transmission to the first mobile network;

transmit, to the second mobile network, a gap request indicating the timing of uplink transmission to the first mobile network; and receive, from the second mobile network, configuration information configuring a gap based on the gap request to the user equipment.

3. An apparatus for controlling a user equipment configured to communicate with a first mobile network by using a first subscriber identity module (SIM) and to communicate with a second mobile network by using a second SIM, the apparatus comprising a processor and a memory, the processor is configured to:

receive, from the first mobile network, information for determining timing of uplink transmission to the first mobile network;

transmit, to the second mobile network, a gap request indicating the timing of uplink transmission to the first mobile network; and receive, from the second mobile network, configuration information configuring a gap based on the gap request to the user equipment.

4. A non-transitory computer-readable medium comprising, stored thereupon, computer program instructions for execution by a user equipment configured to communicate with a first mobile network by using a first subscriber identity module (SIM) and to communicate with a second mobile network by using a second SIM, the program instructions being configured to cause the user equipment to execute processing of:

receiving, by the user equipment from the first mobile network, information for determining timing of uplink transmission to the first mobile network;

transmitting, by the user equipment to the second mobile network, a gap request indicating the timing of uplink transmission to the first mobile network; and receiving, by the user equipment from the second mobile network, configuration information configuring a gap based on the gap request to the user equipment.

5. A system comprising:

a user equipment configured to communicate with a first mobile network by using a first subscriber identity module (SIM) and to communicate with a second mobile network by using a second SIM, wherein the user equipment is configured to:

receive, from the first mobile network, information for determining timing of uplink transmission to the first mobile network;

transmit, to the second mobile network, a gap request indicating the timing of uplink transmission to the first mobile network; and receive, from the second mobile network, configuration information configuring a gap based on the gap request to the user equipment.

* * * * *